US012720473B2

(12) United States Patent
Sahin

(10) Patent No.: US 12,720,473 B2
(45) Date of Patent: Aug. 25, 2026

(54) POSITIONING OF TERMINAL DEVICE GROUPS

(71) Applicant: Nokia Technologies Oy, Espoo (FI)

(72) Inventor: Taylan Sahin, Munich (DE)

(73) Assignee: Nokia Technologies Oy, Espoo (FI)

( * ) Notice: Subject to any disclaimer, the term of this patent is extended or adjusted under 35 U.S.C. 154(b) by 308 days.

(21) Appl. No.: 18/578,391

(22) PCT Filed: Jul. 16, 2021

(86) PCT No.: PCT/EP2021/069958
§ 371 (c)(1),
(2) Date: Jan. 11, 2024

(87) PCT Pub. No.: WO2023/284977
PCT Pub. Date: Jan. 19, 2023

(65) Prior Publication Data

US 2024/0298291 A1 Sep. 5, 2024

(51) Int. Cl.
*H04W 64/00* (2009.01)
*H04L 5/00* (2006.01)
*H04W 24/10* (2009.01)

(52) U.S. Cl.
CPC ........... *H04W 64/00* (2013.01); *H04L 5/0051* (2013.01); *H04W 24/10* (2013.01)

(58) Field of Classification Search
CPC ...... H04W 64/00; H04W 24/10; H04L 5/0051
See application file for complete search history.

(56) References Cited

U.S. PATENT DOCUMENTS

2019/0037338 A1* 1/2019 Edge ........................ H04W 4/02
2020/0128506 A1* 4/2020 Zhang ................... H04W 64/00

FOREIGN PATENT DOCUMENTS

WO 2017/000256 A1 1/2017
WO WO-2020073161 A1 * 4/2020 ............ H04W 12/63
WO WO-2021032907 A1 * 2/2021 .............. H04W 4/02
WO WO-2021064239 A1 * 4/2021 ........... H04L 5/0048

OTHER PUBLICATIONS

"3rd Generation Partnership Project, Technical Specification Group Radio Access Network; NG Radio Access Network (NG-RAN); Stage 2 functional specification of User Equipment (UE) positioning in NG-RAN (Release 16)", 3GPP TS 38.305, V16.4.0, Mar. 2021, pp. 1-119.
"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.

(Continued)

*Primary Examiner* — Dung Hong
(74) *Attorney, Agent, or Firm* — Robert P. Michal, Esq.; Rimon PC

(57) ABSTRACT

To estimate locations of a group of terminal devices, at least one transmission-reception point, or corresponding apparatus, terminal devices in the group and an apparatus providing location services exchange information using group location service related messages towards the terminal devices.

17 Claims, 5 Drawing Sheets

(56) References Cited

OTHER PUBLICATIONS

"3rd Generation Partnership Project; Technical Specification Group Radio Access Network; Study on NR Positioning Enhancements; (Release 17)", 3GPP TR 38.857, V17.0.0, Mar. 2021, 546 pages.
"Revised WID on NR Positioning Enhancements", 3GPP TSG RAN Meeting #91e, RP-210903, Agenda Item: 9.7.25, Intel Corporation, Mar. 16-26, 2022, 6 pages.
"3rd Generation Partnership Project; Technical Specification Group Radio Access Network; LTE Positioning Protocol (LPP) (Release 16)", 3GPP TS 37.355, V16.4.0, Mar. 2021, pp. 1-298.
"Msc-generator", Sourceforge, Retrieved on Jan. 3, 2024, Webpage available at : https://sourceforge.net/projects/msc-generator/.
"3rd Generation Partnership Project; Technical Specification Group Radio Access Network; NG-RAN; NR Positioning Protocol A (NRPPa) (Release 16)", 3GPP TS 38.455, V16.3.0, Apr. 2021, pp. 1-151.
International Search Report and Written Opinion received for corresponding Patent Cooperation Treaty Application No. PCT/EP2021/069958, dated Apr. 7, 2022, 15 pages.
"Enhancement to reduce latency for high vol. positioning", 3GPP TSG-RAN WG2 Meeting #115 Electronic, R2-2108704, Agenda item: 8.11.2, Nokia, Aug. 16-27, 2021, 2 pages.
Office action received for corresponding European Patent Application No. 21746004.7, dated Dec. 22, 2025, 6 pages.
Office action received for corresponding European Patent Application No. 21746004.7, dated Dec. 20, 2024, 9 pages.
Office action received for corresponding European Patent Application No. 21746004.7, dated May 27, 2025, 9 pages.
"3rd Generation Partnership Project, Technical Specification Group Radio Access Network; NG Radio Access Network (NG-RAN); Stage 2 functional specification of User Equipment (UE) positioning in NG-RAN (Release 16)", 3GPP TS 38.305, V16.0.0, Mar. 2020, pp. 1-107.

* cited by examiner detect group location service related message requesting information
501
send requested information
502

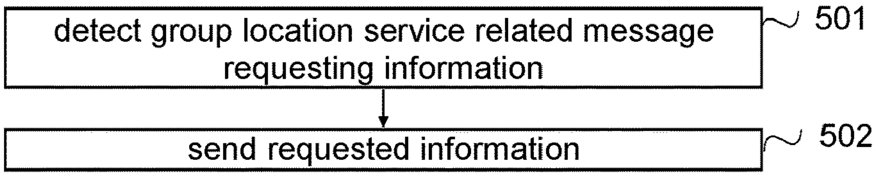

FIG.5
detect group location service related message containing information for positioning
601
apply information
602

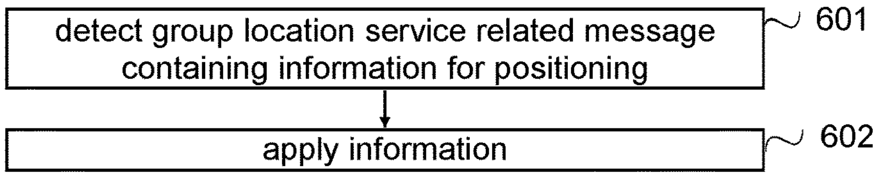

FIG.6
receive group location service related message
701
send as single message to served terminals
702

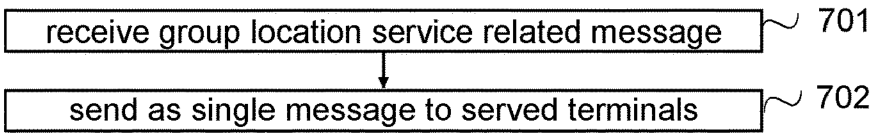

FIG.7
receive from terminals group loc. service info
801
aggregate info
802
send aggregated info to LMP
803

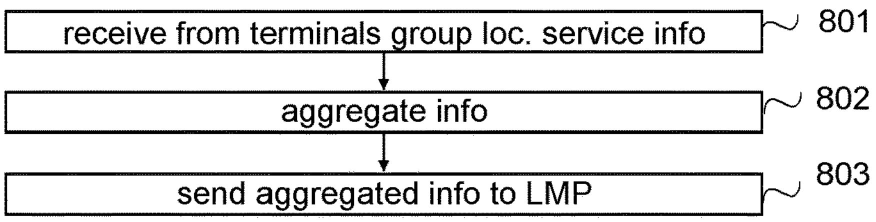

FIG.8
receive request to position group of terminals
901
determine TRPs serving terminals
902
send group location service related message(s)
903

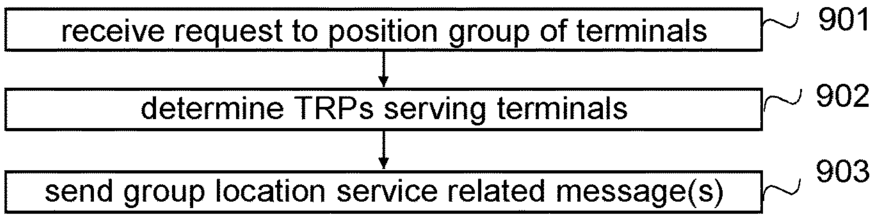

FIG.9
receive info for estimates
1001
determine estimates for group of terminals
1002
send group location service result message(s)
1003

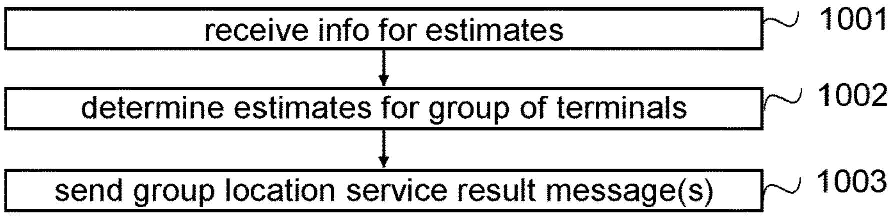

FIG.10

POSITIONING OF TERMINAL DEVICE GROUPS

RELATED APPLICATION

This application claims priority to PCT Application No. PCT/EP2021/069958, filed on Jul. 16, 2021, which is incorporated herein by reference in its entirety.

TECHNICAL FIELD

Various example embodiments relate to wireless communications.

BACKGROUND

Wireless communication systems are under constant development. New applications, use cases and industry verticals requiring positioning of terminal devices are to be envisaged.

BRIEF DESCRIPTION

An aspect provides an apparatus configured to act as a terminal device to be positioned, the apparatus comprising at least one processor; and at least one memory including computer program code, the at least one memory and computer program code being configured to, with the at least one processor, cause the apparatus at least to perform: detecting, in downlink transmissions from a network, a group location service related message, which indicates the apparatus as one of recipients of the group location service related message and contains information for positioning or requests information for positioning; sending, in response to the group location service related message requesting information for positioning, requested information to the network; and applying, in response to the group location service related message containing information for positioning, the information to perform positioning measurements.

In an embodiment, the at least one memory and computer program code are configured to, with the at least one processor, cause the apparatus further at least to perform: receiving from the network information indicating estimated locations of apparatuses included in the indicated recipients of the group location service related message.

In embodiments, the at least one memory and computer program code are configured to, with the at least one processor, cause the apparatus further at least to perform: sending to the network a request for positioning a group of apparatuses belonging at least to one predefined group, the request indicating group members or the at least one group.

An aspect provides an apparatus configured to act as a transmission-reception point, the apparatus comprising at least one processor; and at least one memory including computer program code, the at least one memory and computer program code being configured to, with the at least one processor, cause the apparatus at least to perform: receiving from a location management point a group location service related message, which indicates at least terminal devices served by the apparatus as recipients of the group location service related message and contains information for positioning or requests information for positioning; and sending the group location service related message as a single message to the terminal devices served by the apparatus.

In an embodiment, the at least one memory and computer program code are configured to, with the at least one processor, cause the apparatus further at least to perform: sending, in response to the group location service related message requesting information for positioning being a message requesting positioning, one or more downlink reference signals towards the terminal devices; receiving positioning measurement results from the terminal devices; aggregating the positioning measurements results to be a group positioning measurement results; and forwarding the group positioning measurement result to the location management point.

In embodiments, the at least one memory and computer program code are configured to, with the at least one processor, cause the apparatus further at least to perform: determining, in response to the group location service related message requesting information for positioning being a message requesting group positioning, at least one reference signal configuration for the terminal devices; sending the at least one reference signal configuration as a single message to the terminal devices; measuring reference signal transmissions from the terminal devices; and sending measurement results to the location management point.

In embodiments, the at least one memory and computer program code are configured to, with the at least one processor, cause the apparatus further at least to perform: receiving, during a group positioning session, information relating to the group positioning session from the terminal devices; aggregating the information received to aggregated information; and forwarding the aggregated information to the location management point.

An aspect provides an apparatus configured to act as a location management point, the apparatus comprising at least one processor; and at least one memory including computer program code, the at least one memory and computer program code being configured to, with the at least one processor, cause the apparatus at least to perform: receiving, from a requesting entity, a request to position at least one group of terminal devices; determining at least transmission-reception points serving the terminal devices; and sending a group location service related message, which indicates the terminal devices as recipients of the group location service related message and contains information for positioning or requests information for positioning, to the transmission-reception points to be forwarded to the terminal devices.

In an embodiment, the at least one memory and computer program code are configured to, with the at least one processor, cause the apparatus further at least to perform: receiving measurement reports relating to positioning of the at least one group of terminal devices; estimating locations of the terminal devices using the measurement reports; and sending the locations to the requesting entity or to one or more recipients indicated by the requesting entity in the request.

In embodiments, the at least one memory and computer program code are configured to, with the at least one processor, cause the apparatus further at least to perform: sending a group location service result message, which indicates the terminal devices as recipients of the group location service result message and comprises information indicating estimated locations of the terminal devices, to the transmission-reception points to be forwarded as a group location service related message.

In embodiments the group location service related message is sent to terminal devices using broadcast or groupcast.

In embodiments the group location service related message requesting information for positioning is one of a capability request or a positioning information request.

In embodiments the group location service related message containing information for positioning is one of a reference signal configuration, or assistance data information, or a measurement gap configuration, or a message activating the positioning reference signal configuration, or a message deactivating the positioning reference signal configuration, or a message reconfiguring the positioning reference signal configuration.

In embodiments the recipients of the group location service related message are indicated using information indicating at least one group or information indicating apparatuses belonging to the at least one group.

In embodiments the group location service related message contains information shared by the recipients.

In embodiments the group location service related message contains information targeted to one of the recipients.

In embodiments the group location service related message is a message according to a new radio positioning protocol annex, or a message according to a long term evolution positioning protocol or a message according to a radio resource control protocol.

According to an aspect there is provided an apparatus configured to be positioned, the apparatus comprising means for performing: detecting, in downlink transmissions from a network, a group location service related message, which indicates the apparatus as one of recipients of the group location service related message and contains information for positioning or requests information for positioning; sending, in response to the group location service related message requesting information for positioning, requested information to the network; and applying, in response to the group location service related message containing information for positioning, the information to perform positioning measurements.

According to an aspect there is provided an apparatus configured to act as a transmission-reception point, the apparatus comprising means for performing: receiving from a location management point a group location service related message, which indicates at least terminal devices served by the apparatus as recipients of the group location service related message and contains information for positioning or requests information for positioning; and sending the group location service related message as a single message to the terminal devices served by the apparatus.

According to an aspect there is provided an apparatus configured act as a location management point, the apparatus comprising means for performing: receiving, from a requesting entity, a request to position at least one group of terminal devices; determining at least transmission-reception points serving the terminal devices; and sending a group location service related message, which indicates the terminal devices as recipients of the group location service related message and contains information for positioning or requests information for positioning, to the transmission-reception points to be forwarded to the terminal devices.

According to an aspect there is provided a method for an apparatus configured to be positioned, the method comprising: detecting, in downlink transmissions from a network, a group location service related message, which indicates the apparatus as one of recipients of the group location service related message and contains information for positioning or requests information for positioning; sending, in response to the group location service related message requesting information for positioning, requested information to the network; and applying, in response to the group location service related message containing information for positioning, the information to perform positioning measurements.

According to an aspect there is provided a method for an apparatus configured to act as a transmission-reception point, the method comprising: receiving from a location management point a group location service related message, which indicates at least terminal devices served by the apparatus as recipients of the group location service related message and contains information for positioning or requests information for positioning; and sending the group location service related message as a single message to the terminal devices served by the apparatus.

According to an aspect there is provided a method for an apparatus configured act as a location management point, the method comprising: receiving, from a requesting entity, a request to position at least one group of terminal devices; determining at least transmission-reception points serving the terminal devices; and sending a group location service related message, which indicates the terminal devices as recipients of the group location service related message and contains information for positioning or requests information for positioning, to the transmission-reception points to be forwarded to the terminal devices.

According to an aspect there is provided a computer readable medium comprising program instructions for causing an apparatus configured to be positioned to perform at least the following: detecting, in downlink transmissions from a network, a group location service related message, which indicates the apparatus as one of recipients of the group location service related message and contains information for positioning or requests information for positioning; sending, in response to the group location service related message requesting information for positioning, requested information to the network; and applying, in response to the group location service related message containing information for positioning, the information to perform positioning measurements.

According to an aspect there is provided a computer readable medium comprising program instructions for causing an apparatus configured to act as a transmission-reception point to perform at least the following: sending, in response to receiving from a location management point a group location service related message, which indicates at least terminal devices served by the apparatus as recipients of the group location service related message and contains information for positioning or requests information for positioning, the group location service related message as a single message to the terminal devices served by the apparatus.

According to an aspect there is provided a computer readable medium comprising program instructions for causing an apparatus configured to act as a location management point to perform at least the following: determining, in response to receiving, from a requesting entity, a request to position at least one group of terminal devices, at least transmission-reception points serving the terminal devices; and sending a group location service related message, which indicates the terminal devices as recipients of the group location service related message and contains information for positioning or requests information for positioning, to the transmission-reception points to be forwarded to the terminal devices.

In embodiments, the computer readable medium is a non-transitory computer readable medium.

According to an aspect there is provided a computer program comprising instructions for causing an apparatus configured to be positioned to perform at least the following: detecting, in downlink transmissions from a network, a group location service related message, which indicates the apparatus as one of recipients of the group location service related message and contains information for positioning or requests information for positioning; sending, in response to the group location service related message requesting information for positioning, requested information to the network; and applying, in response to the group location service related message containing information for positioning, the information to perform positioning measurements.

According to an aspect there is provided a computer program comprising instructions for causing an apparatus configured to act as a transmission-reception point to perform at least the following: sending, in response to receiving from a location management point a group location service related message, which indicates at least terminal devices served by the apparatus as recipients of the group location service related message and contains information for positioning or requests information for positioning, the group location service related message as a single message to the terminal devices served by the apparatus.

According to an aspect there is provided a computer program comprising instructions for causing an apparatus configured to act as a location management point to perform at least the following: determining, in response to receiving, from a requesting entity, a request to position at least one group of terminal devices, at least transmission-reception points serving the terminal devices; and sending a group location service related message, which indicates the terminal devices as recipients of the group location service related message and contains information for positioning or requests information for positioning, to the transmission-reception points to be forwarded to the terminal devices.

BRIEF DESCRIPTION OF DRAWINGS

Embodiments are described below, by way of example only, with reference to the accompanying drawings, in which

FIGS. 5 to 12 are flow charts illustrating example functionalities; and

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. Further, although terms including ordinal numbers, such as "first", "second", etc., may be used for describing various elements, the structural elements are not restricted by the terms. The terms are used merely for the purpose of distinguishing an element from other elements. For example, a first signal could be termed a second signal, and similarly, a second signal could be also termed a first signal without departing from the scope of the present disclosure.

Embodiments and examples described herein may be implemented in any communications system comprising wireless connection(s). In the following, different exemplifying embodiments will be described using, as an example of an access architecture to which the embodiments may be applied, a radio access architecture based on new radio (NR, 5G) or long term evolution advanced (LTE Advanced, LTE-A), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), beyond 5G, wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
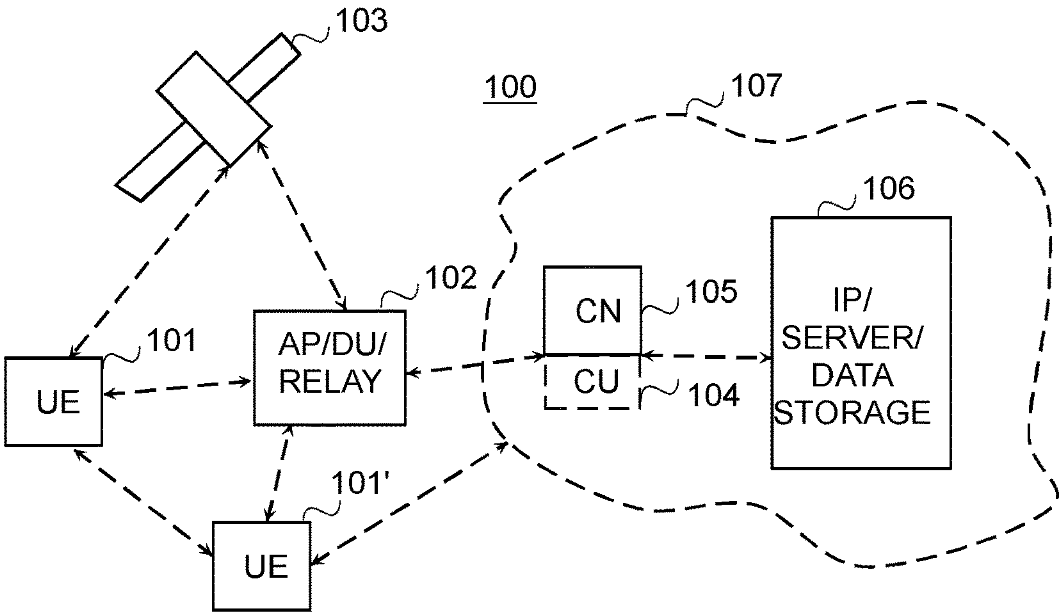
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 101 and 101' configured to be in a wireless connection on one or more communication channels in a cell with an access node (such as (e/g)NodeB) 102 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point (AP) etc. entity suitable for such a usage.

A communications system 100 typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g) NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), access and mobility management function (AMF), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus.

The user device typically refers to a portable computing device that includes wireless mobile communication devices operating with a subscription entity, for example a subscriber identification module (SIM), including, but not limited to, the following types of wireless devices: a mobile station (mobile phone), smartphone, personal digital assistant (PDA), handset, device using a wireless modem (alarm or measurement device, etc.), laptop and/or touch screen computer, tablet, game console, notebook, wearable device, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes or corresponding network devices than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as relay nodes, for example distributed unit (DU) parts of one or more integrated access and backhaul (IAB) nodes, or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

In 5G and beyond, it is envisaged that services, for example in connected robotics and autonomous systems, utilizing position information of smart devices, that may move, will be used more and more often. A non-limiting list of examples of such mobile smart devices include unmanned mobility with fully autonomous connected vehicles, other vehicle-to-everything (V2X) services, or smart industry with different Industrial Internet of Things (IIoT) devices, such as automated guided vehicles or mobile robots or mobile robot arms, and/or services using other user devices, like smart phones or wearable devices, including different accessories. For example, positioning of a plurality of smart devices, such as hundreds of vehicles on a highway within service area of a cell, or a large number of devices in a factory production line, involving one or more groups of them, all at once within a short duration of time, may happen consistently. However, conventional location services position smart devices individually, which may increase a time to obtain location estimates of all the smart devices.

Below term terminal device is used to cover all kind of smart devices that can be positioned, including the above listed examples, and examples listed with FIG. 1, without limiting smart devices to the listed examples.

Figure 2:
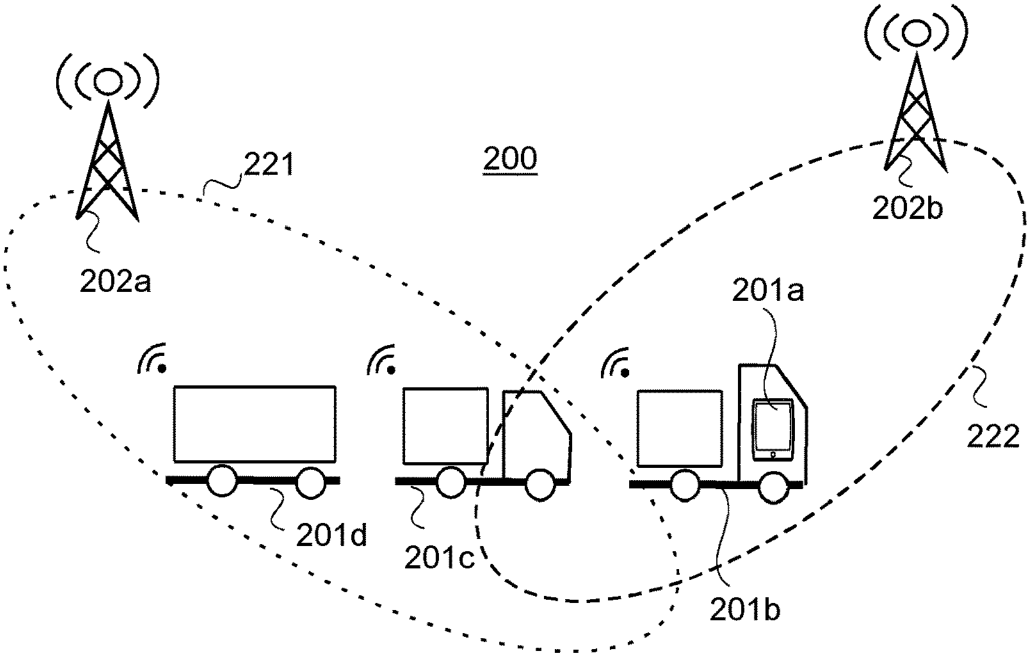
FIG. 2 illustrates an exemplified radio access network positioning architecture.

FIG. 2 provides a highly simplified example of a radio access network positioning architecture disclosing operational entities to position a group of terminal devices.

Referring to FIG. 2, the radio access network 200 comprises, for positioning terminal devices 201*a*, 201*b*, 201*c*, 201*d*, a plurality of apparatuses 202*a*, 202*b* configured to act as a transmission-reception point (TRP) and connected to an apparatus (not shown in FIG. 2) configured to determine terminal devices' positions (location estimates), i.e. configured to position the terminal devices.

The terminal device 201*a*, 201*b*, 201*c*, 201*d* is a device that may move and/or contain movable parts and is configured to communicate with the radio access network 200, either directly or via another terminal device using sidelink communication (direct communication, machine type communications). In the illustrated example the terminal devices 201*a*, 201*b*, 201*c*, 201*d* form a group. Using the vehicle-to-everything service as an example, a group of terminal devices may comprise terminal devices 201*b*, 201*c*, 201*d* in a vehicle, for example one or more devices fixedly mounted, removably inserted to the vehicle, and/or one or more devices 201*a* that may be user-carried devices, such as smart phones, smart wearables etc. that are in the vehicle when the user is in the vehicle. The group may comprise a group of vehicles, or the group may be a wagon fleet with many wagons, traveling as a group. The group may comprise one or more predefined groups and/or one or more "ad-hoc" groups (groups without group identifier), defined by identified one or more terminal devices. For example, the terminal devices 201*b*, 201*c*, 201*d* may form one group, that is part of the group comprising also terminal device 201*a*. The devices in the device group may be devices of one owner, for example, or belong to one domain, for example to a public safety department or a railway operator, or they may have different owners and/or belong to different domains. Further, the terminal devices in a group may be served by different cells 221, 222, as in the example of FIG. 2, or they all may be served by the same cell. Hence, there are no limitations on how to form a group and which terminal devices can belong to a group.

An apparatus 202*a*, 202*b* configured to act as a transmission-reception point, called herein a transmission-reception point, may be a base station or an access node, or an operational entity comprising one or more antennas in a base station, or an operational entity comprising one or more remote radio heads, or a remote antenna of a base station, or any other set of geographically co-located antennas forming one operational entity, for example an antenna array with one or more antenna elements, for one cell in the radio access network, or for a part of the one cell. In other words, one cell may include one or multiple transmission points, and cells in the radio access network comprise transmission-reception points.

In 5G and beyond, one of the positioning techniques providing high accuracy is a multi-cell round trip time positioning, in which a terminal device's position is estimated based on measurements performed by the terminal device on signals (e.g. reference signals) received from one or more transmission-reception points, i.e. based on downlink measurements, and by measurements performed by transmission-reception points on signals received from the user device, i.e. based on uplink measurements. In 5G, it is envisaged that a terminal device's position is estimated by a core network element called a location management function, LMF. However, at least part of the location management function may be distributed to be performed at the radio access network, or even in terminal devices. Hence, herein a term location management point (LMP) is used to cover all above listed possibilities. In other words, the term location management point covers any apparatus, including any node or device or entity, configured to act as the location management point to determine (estimate, calculate) positions of one or more terminal devices. The location management point (apparatus) may be configured to position one or more terminal devices in response to receiving a corresponding positioning request from a service, or from a corresponding application, running in an apparatus, or from an apparatus running the service, requiring the position information. The positioning request may request continuous positioning, or discontinuous positioning, or one-off positioning. The location management point may receive group information, such as different identifying information from the service, or from the apparatus running the service, that requested positioning, or from a group service/server configured to maintain such information. Further, the location management point may be configured to have, or have access to, information on locations (positions) of the transmission-reception points. The position information, i.e. the information on locations, of one or more transaction-reception points may be used when determining the positions of terminal devices. If the location management point is implemented in a terminal device, the terminal device may be configured to determine it's location using the service and/or using other means, for example using a global positioning system based tracking, and use the information to determine the position(s) of one or more other terminal devices using the radio access network.

Figure 3:
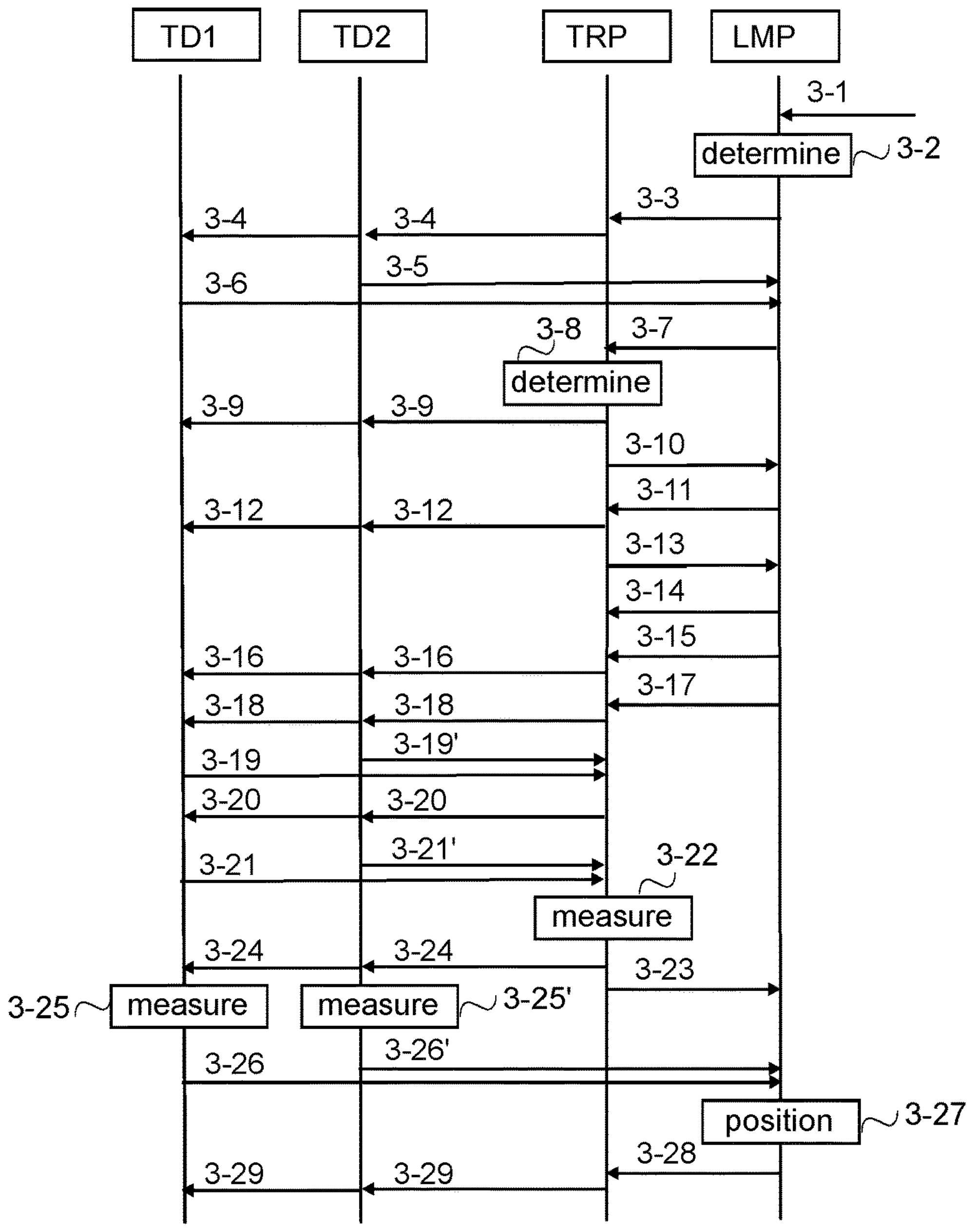
FIGS. 3 and 4 illustrate examples of information exchange.

FIG. 3 illustrates an example of information exchange in an implementation of a group positioning scheme that is based on 5G and the multi-cell round trip time positioning, and hence using terminology used therein, without limiting the example to such an implementation and terminology. It is a straightforward task to implement the example to other positioning schemes, including positioning schemes using only uplink or downlink measurements, and other technologies. Further, it should be appreciated that other apparatuses may be involved in the information exchange, for example information may pass via them, but for the sake of clarity they are not described in more detail herein. To keep the description concise, the information exchange focuses on features specific for positioning a group of terminal devices, and details that are similar for positioning a single terminal device are not necessarily discussed, even though they may be performed.

For example, group identifiers and/or terminal device identifiers used by the service, or the location management point (location management functionality entity), may be different than identifiers used in the radio access network used for the same group and/or the same terminal device. In that case, for example the access and mobility management function entity may map or translate identifiers when forwarding messages between the location management point and transmission-reception point(s) in the radio access network. Another example includes encrypting messages described below so that only terminal devices belonging to the group are able to decrypt the messages. Still a further example includes relaying messages described below over sidelink to one or more terminal devices.

In the illustrated example of FIG. 3, terminal devices TD1, TD2 illustrate terminal devices served by a transmission-reception point TRP, and the location management point LMP is realized by an apparatus in the core network, comprising the location management functionality and configured to communicate (signal) directly, or via one or more other apparatuses, with terminal devices and with transmission-reception points, to exchange information relating to positioning of single terminal devices, and groups of terminal devices. The information exchange between the LMP and the TRP may be according to a new radio positioning protocol annex, the information exchange between the LMP and the TD1, TD2 may be according to a long term evolution positioning protocol and the information exchange from the TRP to the TD1, TD2 may be broadcast or groupcast messages sent (transmitted) using control signaling, for example be a system control information block in a radio resource control message, or sent over a control channel, or over a shared data channel.

Still a further assumption in the example of FIG. 3 is that the TRP determines reference signal configurations. However, it is a straightforward to implement the example to solutions in which the LMP determines the reference signal configurations, or the TRP and the LMP together determine the reference signal configurations.

It should be appreciated that when more than one TRP is involved, for example in the multi-cell scenario illustrated in FIG. 2, the below information exchange will be performed per an involved TRP. Further, positioning may involve also TRPs that are not serving TRPs, for which some of the information exchange may be omitted.

Referring to FIG. 3, the LMP receives a request to position group of terminal devices (message 3-1). The request is a location service request which is a group location service request (a location service request for one or more groups).

There are no limitations who can be a requester, i.e. who created and sent the request. The request may have been created and sent from one of radio access network entities, such as the TRP, or a macro base station. The request may have been created and sent from one of core network entities, such as the access and mobility management function and the LMP (location management functionality) itself, for example using the same principle as a mobile-terminated location request or a network-induced location request. The request may have been created and received from a terminal device, for example using the same principles as a mobile-originated location request, or from an application/service locating and running in the terminal device, for example from an autonomous driving vehicular application. The terminal device wherefrom the request is received may or may not be one of the terminal devices to be positioned. The request may have been created and received from a server, or corresponding apparatus locating outside the radio access network and the core network, connected to the core network. An example of such a server includes an V2X service application server.

The request (message 3-1) contains information indicating terminal devices for which the location service is requested. Depending on an implementation and/or the requester and/or terminal devices to be positioned, the information may be identifiers of one or more groups and/or identifiers of one or more terminal devices. Further, the request may indicate client of the location service, i.e. to whom a response, i.e. location estimates of the terminal devices are to be sent. The client may be the requester, and/or the client may be a group of terminal devices, for example the ones who are to be positioned, or a subgroup of the terminal devices to be positioned. In other words, the client may comprise several entities that may be freely determined. In an embodiment, if no client is indicated in the request, the requester is deemed to be the client.

The group identifiers, and terminal devices belonging to a group, are predefined to the network, and terminal devices know groups they belong to. If the request contained one or more group identifiers, the LMP determines, in block 3-2, terminal devices (identifiers of terminal devices) belonging to the group, using the predefined group information. Then, using the identifiers of the terminal devices, the LMP determines in block 3-2 TRPs serving the terminal devices who are to be positioned.

The LMP requests capability information of terminal devices in the group by sending message 3-3 to the TRP. The message comprises information indicating one or more group identifiers and/or one or more terminal device identifiers. The capability information is needed to configure reference signals, e.g. positioning reference signals, and their measurements to position the terminal devices. Message 3-3 may be called a positioning capability request.

The TRP broadcast/groupcast the positioning capability request in message 3-4, the message comprising the information indicating one or more group identifiers and/or one or more terminal device identifiers.

Terminal device TD2 detects, based either on a group identifier or a terminal identifier in message 3-4, that message 3-4 contains request targeted to it, and sends it capability information in message 3-5 to the LMP, in a similar way as if the request had been for a single terminal device positioning scheme. Also terminal TD1 detects, based either on a group identifier or a terminal identifier in message 3-4, that message 3-4 contains request targeted to it, and sends its capability information in message 3-6 to the LMP. Since messages 3-5 and 3-6 pass the TRP, in the illustrated example the TRP accesses the content in the message, to be used in block 3-8.

The LMP requests positioning information of terminal devices to be positioned using the group positioning scheme by sending message 3-7 to the TRP. The message comprises the information indicating one or more group identifiers and/or one or more terminal device identifiers.

In the illustrated example, upon receiving message 3-7 requesting positioning information, the TRP determines in block 3-8 one or more reference signal configurations, for example sounding reference signal configuration(s), for the terminal devices to send for positioning.

The TRP broadcast/groupcast the determined reference signal configurations of the terminal devices in message 3-9, the message comprising the information indicating one or more group identifiers and/or one or more terminal device identifiers. Based on the identifiers the TD1 and TD2 are able to detect that message 3-9 contains information targeted to them. The reference signal configurations may be per a terminal device, indicated in message 3-9 by associating a reference signal configuration with a corresponding terminal device identifier. Correspondingly, the reference signal configurations may be per a predefined group, indicated in message 3-9 by associating a reference signal configuration with a corresponding group identifier. In an implementation, one of reference signal configurations may be a default configurations to be used by terminal devices not being included in terminal devices indicated by any associated identifier.

Further, the TRP responds to the LMP about the group positioning procedure by sending message 3-13.

The LMP requests activation of reference signal configurations of the terminal devices to be positioned using the group positioning scheme by sending message 3-11 to the TRP. The message comprises the information indicating one or more group identifiers and/or one or more terminal device identifiers.

The TRP broadcast/groupcast the activation of reference signal configurations of the terminal devices in message 3-12, the message comprising the information indicating one or more group identifiers and/or one or more terminal device identifiers. Based on the identifiers the TD1 and TD2 are able to detect that message 3-12 contains information targeted to them.

Further, the TRP responds to the LMP about the activation of reference signal configurations of the terminal devices message 3-13.

The LMP requests measurements from TRP for the positioning the terminal devices to be positioned using the group positioning scheme by sending message 3-14 to the TRP. The message comprises the information indicating one or more group identifiers and/or one or more terminal device identifiers.

The LMP sends assistance data to be used for the terminal devices to be positioned using the group positioning scheme by sending message 3-15 to the TRP. The message comprises the information indicating one or more group identifiers and/or one or more terminal device identifiers. The assistance data indicates, for example, configuration(s) of the reference signals, e.g. positioning reference signals, and measurements for each terminal device. The assistance data may further comprise other information used for positioning, such as the location information of transmission reception points that will send or receive reference signals. The configuration information in the assistance data may indicate time-frequency resources, beam identifiers, and/or TRP identifiers to receive/send positioning reference signals. Further, the LMP may provide all terminal devices to be positioned as a group, using the group positioning scheme, with the same assistance data and/or configuration, or all or some of the terminal devices may be provided, per a terminal device, and/or per a predefined group, with assistance data and/or configuration, which may be different from the assistance data and/or configuration provided to other terminal devices. This is achieved by associating an information element with an identifier that indicates either a group or a terminal device.

The TRP broadcast/groupcast the assistance data in message 3-16, the message comprising the information indicating one or more group identifiers and/or one or more terminal device identifiers. Based on the identifier(s) the TD1 and TD2 are able to detect that message 3-16 contains information targeted to them. It should be noted that the assistance data is assistance data for positioning, which is broadcast or groupcast for a group positioning session, and is targeted to terminal devices to be positioned during the group positioning session, i.e. to a specific group of terminal devices, not necessarily to all served terminal devices.

The LMP requests location information of the terminal devices to be positioned using the group positioning scheme by sending message 3-17 to the TRP. The message comprises the information indicating one or more group identifiers and/or one or more terminal device identifiers. The request may indicate immediate or deferred (with periodic or event-triggered) positioning of the terminal devices. If the request is a for the deferred positioning, the request may indicate periodicity and/or triggering events (distance, condition, thresholds, etc.) of positioning. The triggering events may be the same for all terminal devices to be positioned as a group, using the group positioning scheme, or all or some of the terminal devices may be provided, per a terminal device, with triggering event(s), which may be different from the triggering events provided to other terminal devices. This is achieved by associating an information element with an identifier that indicates either a group or a terminal device.

The TRP broadcast/groupcast the location information request in message 3-18, the message comprising the information indicating one or more group identifiers and/or one or more terminal device identifiers. Based on the identifiers the TD1 and TD2 are able to detect that message 3-18 contains information targeted to them.

The TD1 indicates its location measurement information to the TRP by sending message 3-19, and the TD2 indicates its location measurement information to the TRP by sending message 3-19'.

The TRP broadcast/groupcast location measurement gap configuration in message 3-20, the message comprising the information indicating one or more group identifiers and/or one or more terminal device identifiers. Based on the identifiers the TD1 and TD2 are able to detect that message 3-20 contains information targeted to them. The measurement gap configuration may indicate time-frequency resources, beam identifiers, and/or TRP identifiers to receive/send reference signals.

The TD1 and TD2 apply the received configurations for reference signals and measurements, and send reference signals (messages 3-21, 3-21') to the TRP(s). The reference signals may be sounding reference signals.

The TRP measures in block 3-22, i.e. performs measurements of, received uplink reference signals and sends the measurement results in message 3-23 to the LMP.

The TRP also sends reference signal (message 3-24). The reference signal may be a positioning reference signal.

The TD1 and TD2 apply the received configurations for reference signals and measurements, and measure, in blocks 3-25, 3-25', i.e. perform measurement of, received downlink reference signals, and send the measurement results in messages 3-26, 3-26' to the LMP. It should be appreciated that terminal devices may also perform measurements over sidelink. The measurement results of a terminal device may include a location estimate (relative or absolute) calculated by the terminal device, that may be associated with time information, for example with a time stamp, which indicates a relative or absolute time of the location estimate. The measurement results may also comprise other information, for example information regarding a mobility of the terminal device, such as a speed, velocity, acceleration, heading, orientation, etc., and accuracy or expected error of the information included in the measurement results. In another implementation, terminal devices are configured to send the measurement results to their serving TRP which may send the measurement results as they come to the LMP, or aggregate the measurement results and send aggregated measurement results to the LMP. The aggregated measurement results may comprise the measurement results of the TRP (i.e. no message 3-23 sent separately).

The LMP positions in block 3-27 the terminal devices, i.e. calculates location estimates of the terminal devices, using the measurement results received from TRPs and terminal devices. Further, using the information on the client, received in message 3-1, the LMP determines recipients of the location estimates. In the illustrated example the client, i.e. the recipients are the terminal devices forming the group of terminal devices whose location estimates (positions) were requested in message 3-1. Therefore, in the illustrated example, the LMP sends a location service response, i.e. a group location service result message, including location estimates of the terminal devices, using the group positioning scheme, to the TRP by sending message 3-28. The message 3-28 comprises the information indicating one or more group identifiers and/or one or more terminal device identifiers.

The TRP broadcast/groupcast the location service response in message 3-29, the message comprising the information indicating one or more group identifiers and/or one or more terminal device identifiers. Based on the identifiers the TD1 and TD2 are able to detect that message 3-20 contains information targeted to them, or to an application running in them.

If the client would have been a single terminal device, or a small number of terminal devices, message 3-29 could have been a unicast message, or the LMP may have sent the location service response to the terminal device(s), using for example the long term evolution positioning protocol. Still a further possibility is to multicast message 3-29.

Figure 4:
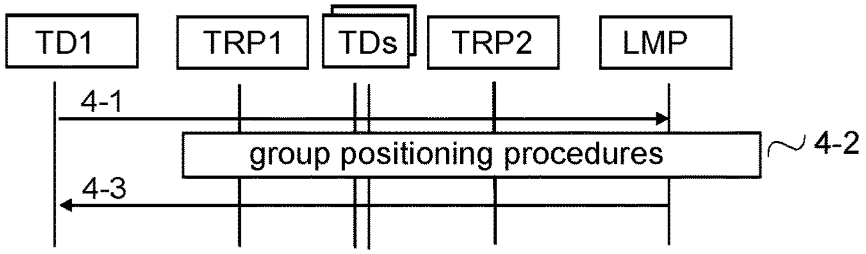

FIG. 4 illustrates another information exchange example, in which a requesting terminal device is not within the group of terminal devices to be positioned. For example, in the example of FIG. 2, a predefined group of terminal devices may comprise the terminal devices 201*b*, 201*c* and 201*d*, in the terminal device 201*a* location service application is running and a user input requesting location information on the terminal devices in the group is received.

Referring to FIG. 4, the terminal device TD1 sends a request to position group of terminal devices (message 4-1). The request contains information indicating one or more group identifiers and/or one or more terminal device identifiers, as described above with message 3-1, and indication that a response is to be sent to the TD1. Then a group positioning procedure (group positioning scheme) is performed between the LMP, transmission-reception points TRP1, TRP2, and the terminal devices TDs, for example as illustrated in FIG. 3. The location estimates of the terminal devices TDs are then sent in message 4-3, as a response to the request, to the TD1.

Messages 4-1 and 4-3 may be according to the long term evolution positioning protocol.

FIGS. 5 and 6 illustrate different functionalities an apparatus, for example a terminal device or a transmission-reception point, may be configured to perform.

Referring to FIG. 5, the apparatus detects in block 501, in downlink transmissions from a network, a group location service related message, which requests information for positioning. For example, the detected message may be any of the messages 3-3, 3-4, 3-7, 3-17, 3-18 described above. The detected message may contain, as recipient information (indicated recipients), one or more group identifiers and/or one or more terminal device identifiers. If the apparatus is a terminal device, based on the recipient information, the apparatus detects that the message contains information targeted to it. If the apparatus is a transmission-reception point, the recipient information indicates terminal devices served by the transmission-reception point.

The apparatus then sends, in block 502, requested information to the network. The send information may be content in any of the messages 3-5, 3-6, 3-10, 3-23, 3-26, 3-26'.

Referring to FIG. 6, the apparatus detects in block 601, in downlink transmissions from a network, a group location service related message, which contains information for positioning. For example, the detected message may be one of a reference signal configuration, or assistance data information, or a measurement gap configuration, or a message activating the positioning reference signal configuration, or a message deactivating the positioning reference signal configuration, or a message reconfiguring the positioning reference signal configuration, such as any of the messages 3-11, 3-12, 3-14, 3-15, 3-16 described above. is The detected message may contain, as recipient information, one or more group identifiers and/or one or more terminal device identifiers. If the apparatus is a terminal device, based on the recipient information, the apparatus detects that the message contains information targeted to it. If the apparatus is a transmission-reception point, the recipient information indicates terminal devices served by the transmission-reception point.

The apparatus then applies in block 602 the information, for example to perform at least positioning measurements according to the information and/or to send reference signals for positioning according to the information.

The apparatus may perform the above functionalities described in FIGS. 5 and 6 several times during a group positioning session. Further, the apparatus may perform between the blocks other functions as well.

FIGS. 7 and 8 illustrate different functionalities an apparatus, for example an apparatus comprising a transmission-reception point, may be configured to perform.

Referring to FIG. 7, the apparatus receives in block 701, from a location management point, or from a corresponding network entity, for example a location management server or the location management function, a group location service related message, which indicates at least terminal devices served by the apparatus as recipients of the group location service related message. The message may contain information for positioning or the message may request information for positioning. For example, the received message may be any of the messages 3-3, 3-7, 3-11, 3-14, 3-15, 3-17 described above. The received message may contain one or more group identifiers and/or one or more terminal device identifiers.

The apparatus then sends in block 702 the group location service related message as a single message to the terminal devices served by the apparatus (to the served terminals). The single message may be sent as broadcast or groupcast.

In another implementation, the apparatus may be configured to determine, whether the number of served terminal devices is below a preset limit, and if the number of served terminal devices is below the preset limit, send the group location service related message as unicast or multicast to the served terminal device(s).

Referring to FIG. 8, it is assumed the apparatus has received a group location service related message, and is aware that a group positioning process (session) is going on, the process involving terminal devices (terminals) served by the apparatus, and is receiving in block 801 group location service related information, for example measurement results, or any other information, for example group capability information, if not send directly to the LMP.

The apparatus aggregates in block 802 the received information, and then sends in block 803 the aggregated information in a message (aggregated message) to the location management point. Depending on an implementation, the apparatus may wait for until information is received from all served apparatuses, or from a predefined subset (number of terminal devices), before sending a message comprising the aggregated information, or a message comprising aggregated information may be sent in certain intervals.

For example, the apparatus may have sent one or more downlink reference signals towards the terminal devices, and receives in block 801 positioning measurement results from the terminal devices, and aggregates in block 802 the positioning measurements results to be a group positioning measurement result; and forward in block 803 the group positioning measurement result to the location management point. Further examples include aggregated capability information (group capability information).

FIGS. 9 to 12 illustrate different functionalities an apparatus, for example an apparatus comprising a location management point, or part of its functionalities, may be configured to perform.

Referring to FIG. 9, the apparatus receives in block 901 from a requesting entity a request to position at least one group of terminal devices (terminals). Examples of the request and requesting entities are listed above with block 3-1, for example. The apparatus determines in block 902 at least transmission-reception points serving the terminal devices, and then sends in block 903 at least one group location service related message, a message per a transmission reception point. The group location service related message indicates the terminal devices as recipients of the group location service related message and contains information for positioning or requests information for positioning, to the transmission-reception points to be forwarded to the terminal devices.

Referring to FIG. 10, the apparatus receives in block 1001 information for estimating locations. The information may be measurement reports relating to positioning of the at least one group of terminal devices and/or estimated locations, calculated (determined, estimated) by a transmission reception point or by a terminal device itself, depending on an implementation.

The apparatus then estimates in block 1002 locations of the terminal devices (terminals), for example using the measurement reports and/or received estimated location and then sends in block 1003 location estimates to a requesting entity which requested the estimated locations and/or to one or more recipients indicated by the requesting entity in the request.

Figure 11:
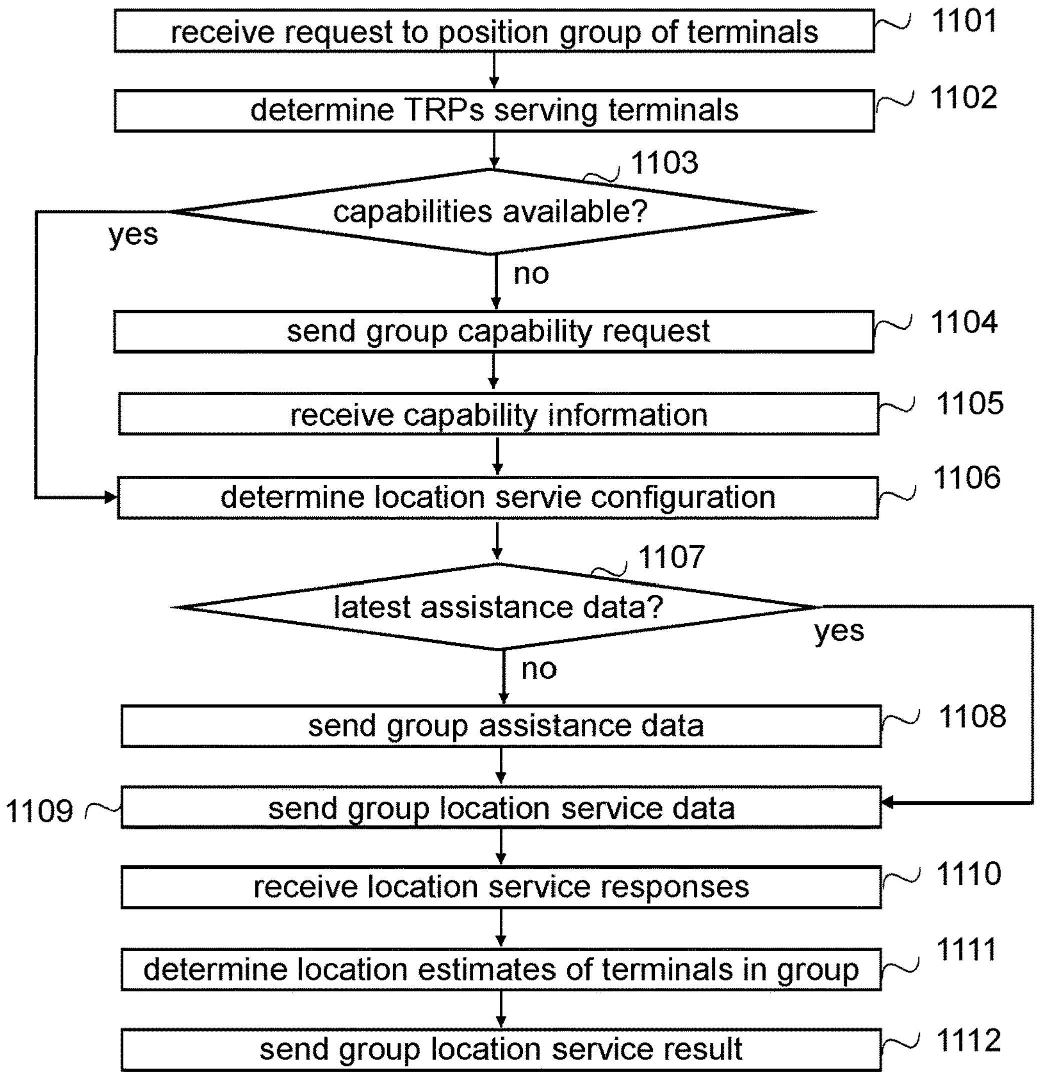

Referring to FIG. 11, the apparatus receives in block 1101 from a requesting entity a request to position at least one group of terminal devices (terminals). Examples of the request and requesting entities are listed above with block 3-1, for example. The apparatus determines in block 1102 at least transmission-reception points serving the terminal devices, and then the apparatus checks, in block 1103, whether capability information of the terminal devices to be positioned is available for the apparatus, for example whether the apparatus has, or has access to, the capability information. If not (block 1103: no), the apparatus sends in block 1104 a group capability request, for example a message corresponding to message 3-3 in FIG. 3, and receives in block 1105 the capability information.

Then, or if the apparatus has the capability information (block 1103: yes), the apparatus determines, in block 1106, location service configuration (group location service configuration). Determining of the location service configuration may comprise selecting one or more anchor transmission-reception points, determining reference signal configuration, etc. for positioning.

The apparatus checks in block 1107, whether the terminal devices to be positioned are provided with the latest assistance data for positioning, the assistance data being needed to position them. If not (block 1107: no), group assistance data is addressed, by group identifiers or terminal identifiers, to the terminal devices and sent in block 1108 to the terminal devices, the group assistance data comprising assistance data dedicated to positioning of the at least one group indicated in the request received in block 1101.

Then, or if the terminal devices have the latest assistance data (block 1107: yes), the apparatus sends in block 1109 group location service data, the group location service data comprising the location service configuration and a request for positioning measurements, possibly also activation of reference signals (positioning signals).

The apparatus receives in block 1110 location service responses, i.e. information for estimating locations. The information may be measurement reports relating to positioning of the at least one group of terminal devices and/or estimated locations, calculated by a transmission reception point or by the terminal device, depending on an implementation.

The apparatus then determines in block 1111 location estimates of the terminal devices (estimates locations), for example using measurement reports and/or received estimated locations and then sends in block 1112 a group location service result, i.e. the location estimates. The group location service result (group location service result message) may be sent to a requesting entity wherefrom the request in block 1101 was received and/or to one or more recipients indicated by the requesting entity in the request.

Figure 12:
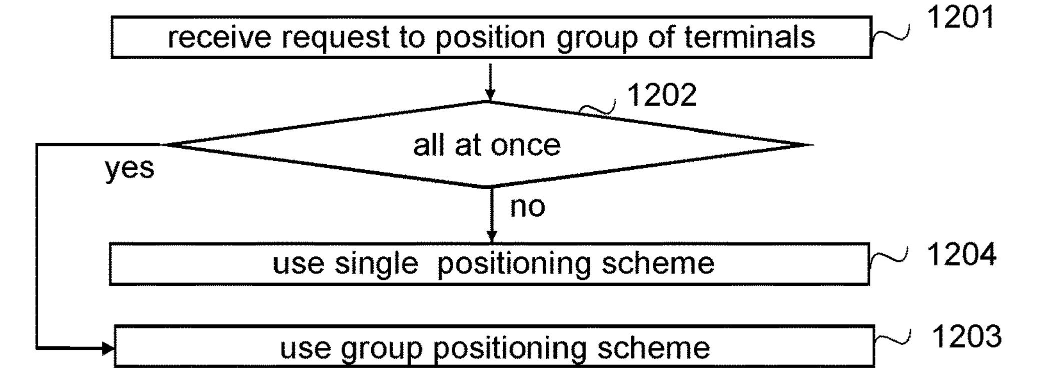

It may be that a request to position a group of terminal devices indicates, whether the location service is requested separately for the terminal devices or all at once for all terminal devices. The indication may be a group-specific indication, if the request comprises more than one group identifier, or one group identifier and then terminal device identifiers (depending on an implementation, the terminal device identifiers may be interpreted to form one group, or treated separately). FIG. 12 discloses one implementation how to process such a request. The process may be performed per a group, if the request indicates two or more groups.

Referring to FIG. 12, the apparatus receives in block 1201 from a requesting entity a request to position at least one group of terminal devices (terminals). If the request indicates all at once (block 1202: yes), a group positioning scheme is used (block 1203). The group positioning scheme may be any of positioning schemes described herein. If the request indicates positioning separately (block 1202: no), a single positioning scheme, for example a conventional positioning scheme, is used, per a terminal device.

The indication "all at once" or "separately" may be used also when sending group location service result messages. For example, the group location service result messages (location service responses) may be sent when location estimates of all terminal devices are calculated, or per a terminal device whose location estimate is calculated, even though the group location service result is sent to all the terminal devices.

As can be seen from the above, the illustrated examples reduce a positioning latency by utilizing broadcast or groupcast compared to use of multiple unicast messages, especially when there is a need to position plurality of terminal devices, such as hundreds of vehicles on a highway served by a cell in the V2X, or a large number of devices in a factory production line in IIoT. Further, groupcast/broadcast messages enable to address and position a plurality of terminal devices all at once, in a single downlink message per a transmission-reception point, thus resulting in lower signaling overhead and higher network efficiency. Further, since vehicular or industrial use cases typically have terminal devices within proximity with same or similar service requirements and radio conditions, groupcast/broadcast messages enable transmission of the same or similar content, e.g. configurations, for positioning the terminal devices, which highly increases the gain in terms of network signaling and resource consumption. However, as described above, the examples allow the downlink messages to carry different content for different terminal devices, if necessary.

When using broadcast or groupcast as described in the above examples, the terminal devices receive the information, requests and downlink reference signals almost at the same time, which increases positioning accuracy compared to a situation in which the process of FIG. 3, for example, would be performed separately for each terminal device.

The examples enable terminal devices, for example user equipments, to request and acquire position information of a group of terminal devices at once, and the examples also allow a timely and efficient solution to exchange positioning information across terminal devices, without need for them to request the positioning information separately. These facilitate, for example, autonomous driving, where vehicles act based on the position/velocity of other vehicles in their surroundings, or are interested in the positions of other devices in a communication group to exchange information, for example sensor data of a specific area collected and fused among a group of vehicles.

The blocks, related functions, and information exchanges described above by means of FIGS. 2 to 12 are in no absolute chronological order, and some of them may be performed simultaneously or in an order differing from the given one. Other functions can also be executed between them or within them, and other information may be transmitted, and/or other rules applied or selected. Some of the blocks or part of the blocks or one or more pieces of information can also be left out or replaced by a corresponding block or part of the block or one or more pieces of information. For example, assistance data and/or configuration information may be preconfigured to the terminal devices. Further, part of the above blocks and/or information exchange may be performed as a standalone process, for example provisioning the group assistance data without any measurements and/or with configuration information for positioning and/or activation for positioning.

Figure 13:
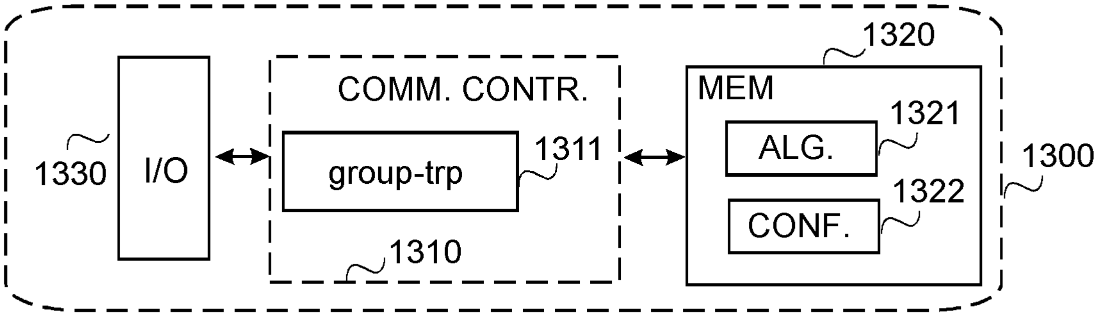
FIGS. 13 to 15 are schematic block diagrams.
Figure 14:
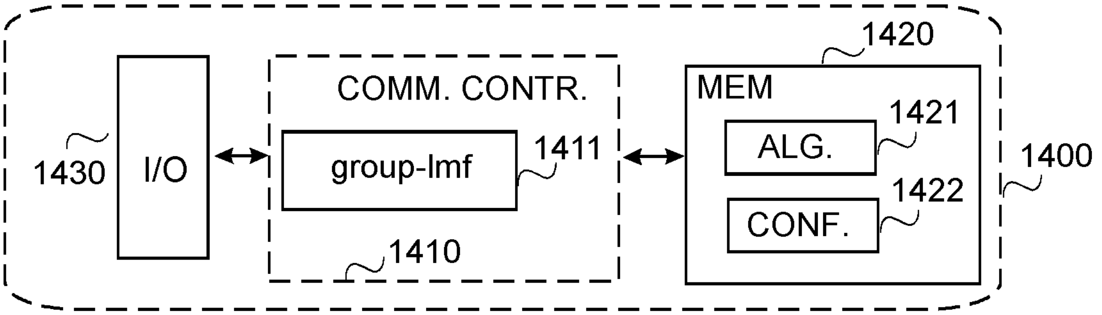
Figure 15:
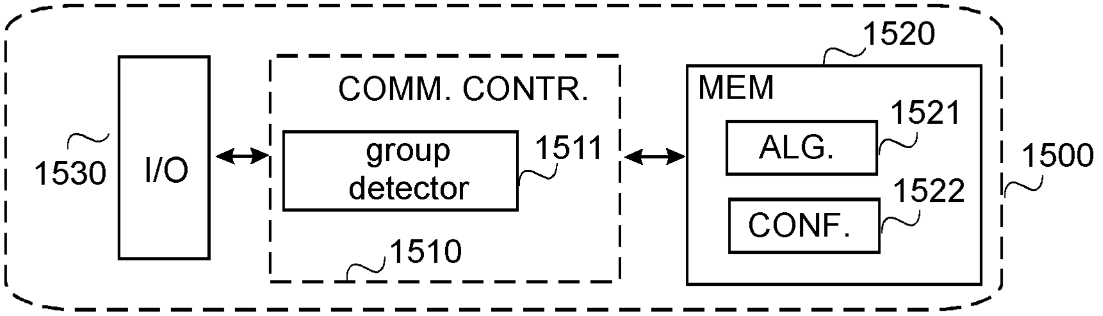

FIGS. 13, 14, and 15 illustrate apparatuses comprising a communication controller 1310, 1410, 1510 such as at least one processor or processing circuitry, and at least one memory 1320, 1420, 1520 including a computer program code (software, algorithm) ALG. 1321, 1421, 1521, wherein the at least one memory and the computer program code (software, algorithm) are configured, with the at least one processor, to cause the respective apparatus to carry out any one of the embodiments, examples and implementations described above. FIG. 13 illustrates an apparatus configured to provide a transmission-reception point, configurable by apparatus in FIG. 14 to transmit for example reference signals, or corresponding signals, FIG. 14 illustrates an apparatus, for example a network apparatus, configured to provide location management point (location management function), or any corresponding apparatus, suitable for positioning terminal device groups and for configuring apparatuses in FIGS. 13 and 15 for positioning, and FIG. 15 illustrates an apparatus to be positioned, and to report measurements as configured by apparatus in FIG. 14. The apparatuses of FIGS. 13, 14 and 15 may be electronic devices, examples being listed above with FIGS. 1 and 2. It should be appreciated that an apparatus may be a combination of the apparatuses in FIG. 13 and/or FIG. 14 and/or FIG. 15.

Referring to FIGS. 13, 14 and 15, the memory 1320, 1420, 1520 may be implemented using any suitable data storage technology, such as semiconductor based memory devices, flash memory, magnetic memory devices and systems, optical memory devices and systems, fixed memory and removable memory. The memory may comprise a configuration storage CONF. 1321, 1421, 1521, such as a configuration database, for at least storing information for positioning. The memory 1320, 1420, 1520 may further store a data buffer for data waiting to be processed (including transmission).

Referring to FIG. 13, the apparatus, for example a gNB or an access point providing a transmission-reception point, comprises a communication interface 1330 comprising hardware and/or software for realizing communication connectivity according to one or more wireless and/or wired communication protocols. The communication interface 1330 may provide the apparatus with radio communication capabilities, as well as communication capabilities towards a wired network. For example, the communication interface 1330 may provide the apparatus 1300 with communication capabilities with the apparatus of FIG. 14 and the apparatus of FIG. 15.

Digital signal processing regarding transmission and reception of signals may be performed in a communication controller 1310. The communication interface may comprise standard well-known components such as an amplifier, filter, frequency-converter, (de)modulator, and encoder/decoder circuitries and one or more antennas.

The communication controller 1310 comprises a group transmission-reception point processing circuitry 1311 (group-trp) configured at least to receive group location service related messages, to broadcast or multicast them and to transmit reference signals as configured according to any one of the embodiments/examples/implementations described above. The communication controller 1310 may control the group transmission-reception point processing circuitry 1311. Further, the communication controller 1310 may control information exchange according to a corresponding configuration.

In an embodiment, at least some of the functionalities of the apparatus of FIG. 13 may be shared between two physically separate devices, forming one operational entity. Therefore, the apparatus may be seen to depict the operational entity comprising one or more physically separate devices for executing at least some of the processes described with respect to the transmission-reception point.

Referring to FIG. 14, the apparatus, for example location management point, comprises a communication interface 1430 comprising hardware and/or software for realizing communication connectivity according to one or more wireless and/or wired communication protocols. The communication interface 1430 may provide the apparatus with radio communication capabilities, as well as communication capabilities with a wired network. For example, the communication interface 1430 may provide the apparatus 1400 with communication capabilities with the apparatus of FIG. 13 and the apparatus of FIG. 15.

Digital signal processing regarding transmission and reception of signals may be performed in a communication controller 1410. The communication interface may comprise standard well-known components such as an amplifier, filter, frequency-converter, (de)modulator, and encoder/decoder circuitries and one or more antennas.

The communication controller 1410 comprises a group location management functionality processing circuitry 1411 (group-lmf) configured at least to position terminal device groups according to any one of the embodiments/examples/implementations described above. The communication controller 1410 may control the group location management functionality processing circuitry 1411. Further, the communication controller 1410 may control information exchange.

In an embodiment, at least some of the functionalities of the apparatus of FIG. 14 may be shared between two physically separate devices, forming one operational entity. Therefore, the apparatus may be seen to depict the operational entity comprising one or more physically separate devices for executing at least some of the processes described with respect to the network apparatus and/or location management point.

Referring to FIG. 15, the apparatus 1500 may further comprise a communication interface 1530 comprising hardware and/or software for realizing communication connectivity according to one or more communication protocols. The communication interface 1530 may provide the apparatus 1500 with communication capabilities with the apparatus of FIG. 13 and the apparatus of FIG. 14. The communication interface may comprise standard well-known analog components such as an amplifier, filter, frequency-converter and circuitries, and conversion circuitries transforming signals between analog and digital domains. Digital signal processing regarding transmission and reception of signals may be performed in a communication controller 1510.

The communication controller 1510 comprises a group location service related message processing circuitry 1511 (group detector) configured to detect (measure) group location service related messages indicating the apparatus as one of the recipients and perform corresponding functionality according to any one of the embodiments/examples/implementations described above. The communication controller 1510 may control the group location service related message processing circuitry 1511.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 3 to 12 may be carried out by an apparatus comprising corresponding means for carrying out at least some of the described processes. The apparatus may comprise separate means for separate phases of a process, or means may perform several phases or the whole process. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments/examples/implementations described herein.

According to yet another embodiment, the apparatus carrying out the embodiments/examples comprises a circuitry including at least one processor and at least one memory including computer program code. When activated, the circuitry causes the apparatus to perform at least some of the functionalities according to any one of the embodiments/examples/implementations of FIG. 2 to 12, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the apparatuses (nodes) described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments/examples/implementations as described may also be carried out in the form of a computer process defined by a computer program or portions thereof. Embodiments of the methods described in connection with FIGS. 2 to 12 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus configured to act as a terminal device to be positioned, the apparatus comprising:
- at least one processor; and
- at least one memory including computer program code, the at least one memory and computer program code configured to, with the at least one processor, cause the apparatus at least to perform:
  - detecting, in downlink transmissions from a network, a group location service related message, which indicates the apparatus as one of recipients of the group location service related message and contains information for positioning or requests information for positioning;
  - sending, in response to the group location service related message requesting information for positioning, requested information to the network;
  - applying, in response to the group location service related message containing information for positioning, the information to perform positioning measurements; and
  - receiving at least one reference signal configuration as a single message in response to the network determining the at least one reference signal configuration for the terminal device, based on the group location service related message requesting information for positioning being a message requesting group positioning.

2. The apparatus of claim 1, wherein the at least one memory and computer program code configured to, with the at least one processor, cause the apparatus further at least to perform:
- receiving from the network information indicating estimated locations of apparatuses included in the indicated recipients of the group location service related message.

3. The apparatus of claim 1, wherein the at least one memory and computer program code configured to, with the at least one processor, cause the apparatus further at least to perform:
- sending to the network a request for positioning a group of apparatuses belonging at least to one predefined group, the request indicating group members or the at least one group.

4. An apparatus configured to act as a transmission-reception point, the apparatus comprising:
- at least one processor; and
- at least one memory including computer program code, the at least one memory and computer program code configured to, with the at least one processor, cause the apparatus at least to perform:
  - receiving from a location management point a group location service related message, which indicates at least terminal devices served by the apparatus as recipients of the group location service related message and contains information for positioning or requests information for positioning;

sending the group location service related message as a single message to the terminal devices served by the apparatus;

determining, in response to the group location service related message requesting information for positioning being a message requesting group positioning, at least one reference signal configuration for the terminal devices; and sending the at least one reference signal configuration as a single message to the terminal devices.

5. The apparatus of claim 4, wherein the at least one memory and computer program code configured to, with the at least one processor, cause the apparatus further at least to perform:

sending, in response to the group location service related message requesting information for positioning being a message requesting positioning, one or more downlink reference signals towards the terminal devices;

receiving positioning measurement results from the terminal devices;

aggregating the positioning measurements results to be a group positioning measurement results; and forwarding the group positioning measurement result to the location management point.

6. The apparatus of claim 4, wherein the at least one memory and computer program code configured to, with the at least one processor, cause the apparatus further at least to perform:

measuring reference signal transmissions from the terminal devices; and sending measurement results to the location management point.

7. The apparatus of claim 4, wherein the at least one memory and computer program code configured to, with the at least one processor, cause the apparatus further at least to perform:

receiving, during a group positioning session, information relating to the group positioning session from the terminal devices;

aggregating the information received to aggregated information; and forwarding the aggregated information to the location management point.

8. An apparatus configured to act as a location management point, the apparatus comprising:

at least one processor; and at least one memory including computer program code, the at least one memory and computer program code configured to, with the at least one processor, cause the apparatus at least to perform:

receiving, from a requesting entity, a request to position at least one group of terminal devices;

determining at least transmission-reception points serving the terminal devices; and sending a group location service related message, which indicates the terminal devices as recipients of the group location service related message and contains information for positioning or requests information for positioning, to the transmission-reception points to be forwarded to the terminal devices;

determining, in response to the group location service related message requesting information for positioning being a message requesting group positioning, at least one reference signal configuration for the terminal devices; and sending the at least one reference signal configuration as a single message to the terminal devices.

9. The apparatus of claim 8, wherein the at least one memory and computer program code configured to, with the at least one processor, cause the apparatus further at least to perform:

receiving measurement reports relating to positioning of the at least one group of terminal devices;

estimating locations of the terminal devices using the measurement reports; and sending the locations to the requesting entity or to one or more recipients indicated by the requesting entity in the request.

10. The apparatus of claim 9, wherein the at least one memory and computer program code configured to, with the at least one processor, cause the apparatus further at least to perform:

sending a group location service result message, which indicates the terminal devices as recipients of the group location service result message and comprises information indicating estimated locations of the terminal devices, to the transmission-reception points to be forwarded as a group location service related message.

11. The apparatus of claim 8, wherein the group location service related message is sent to terminal devices using broadcast or groupcast.

12. The apparatus of claim 8, wherein the group location service related message requesting information for positioning is one of a capability request or a positioning information request.

13. The apparatus of claim 8, wherein the group location service related message containing information for positioning is one of a reference signal configuration, or assistance data information, or a measurement gap configuration, or a message activating the positioning reference signal configuration, or a message deactivating the positioning reference signal configuration, or a message reconfiguring the positioning reference signal configuration.

14. The apparatus of claim 8, wherein the recipients of the group location service related message are indicated using information indicating at least one group or information indicating apparatuses belonging to the at least one group.

15. The apparatus of claim 8, wherein the group location service related message contains information shared by the recipients.

16. The apparatus of claim 8, wherein the group location service related message contains information targeted to one of the recipients.

17. The apparatus of claim 8, wherein the group location service related message is a message according to a new radio positioning protocol annex, or a message according to a long term evolution positioning protocol or a message according to a radio resource control protocol.

* * * * *